United States Patent
Aarts et al.

(10) Patent No.: US 9,752,568 B2
(45) Date of Patent: Sep. 5, 2017

(54) APPARATUS AND METHOD FOR PROVIDING A USER INTERFACE TO AN INFORMATION PROCESSING SYSTEM

(75) Inventors: Ronaldus Maria Aarts, Eindhoven (NL); Joris Adelbert Maria Nieuwendijk, Eindhoven (NL); Okke Ouweltjes, Eindhoven (NL); Gerben Kooijman, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1576 days.

(21) Appl. No.: 13/139,822

(22) PCT Filed: Dec. 8, 2009

(86) PCT No.: PCT/IB2009/055581
§ 371 (c)(1),
(2), (4) Date: Jun. 15, 2011

(87) PCT Pub. No.: WO2010/070534
PCT Pub. Date: Jun. 24, 2010

(65) Prior Publication Data
US 2011/0250958 A1   Oct. 13, 2011

(30) Foreign Application Priority Data

Dec. 19, 2008  (EP) .................................. 018172344

(51) Int. Cl.
*F04B 45/04*    (2006.01)
*F04B 45/047*   (2006.01)
(Continued)

(52) U.S. Cl.
CPC .............. *F04B 45/04* (2013.01); *F04B 35/04* (2013.01); *F04B 45/043* (2013.01);
(Continued)

(58) Field of Classification Search
CPC ........ A63F 13/285; F04B 35/04; F04B 43/04; F04B 43/067; F04B 45/047; H04R 1/028;
(Continued)

(56) References Cited

U.S. PATENT DOCUMENTS 3,272,926 A * 9/1966 Falkenberg .................... 381/372
4,757,547 A    7/1988 Danley
(Continued)

FOREIGN PATENT DOCUMENTS

BE  WO 2008023346 A1 *  2/2008  .......... H04R 1/1091
DE     102004051728 A1    4/2006
(Continued)

OTHER PUBLICATIONS

Philips: "Gaming Just Got Better"; Philips Leaflet on amBX PC Gaming Peripherals, Downloaded From http:www.ambx.philips.comien/gb/ambx_leaflet_EN.pdf, on Nov. 20, 2008, 6 Page Document.

*Primary Examiner* — Alexander Comley

(57) ABSTRACT

An apparatus for use as an output device of a user interface to an information processing system includes at least one device for generating a synthetic jet. The device is capable of producing outputs with different modalities. Examples of different modalities that are possible include airflows, vibration and sound.

6 Claims, 2 Drawing Sheets

(51) Int. Cl.
 F04B 49/00 (2006.01)
 F04B 35/04 (2006.01)
 G06F 3/01 (2006.01)

(52) U.S. Cl.
 CPC .......... F04B 45/047 (2013.01); F04B 49/005 (2013.01); G06F 3/016 (2013.01); *A63F 2300/302* (2013.01)

(58) Field of Classification Search
 CPC ...... H04R 1/10; H04R 1/1008; H04R 1/1091; H04R 5/02; H04R 5/023; H04R 5/033; H04R 2499/13
 USPC ........... 463/30, 46; 417/413.1; 381/370, 309
 See application file for complete search history.

(56) References Cited

U.S. PATENT DOCUMENTS

| | | | |
|---|---|---|---|
| 4,821,323 A * | 4/1989 | Papiernik | 381/309 |
| 5,266,070 A | 11/1993 | Hagiwara et al. | |
| 5,696,521 A * | 12/1997 | Robinson et al. | 345/8 |
| 5,798,922 A * | 8/1998 | Wood et al. | 700/94 |
| 5,894,990 A * | 4/1999 | Glezer et al. | 239/423 |
| 6,115,846 A * | 9/2000 | Truesdale | 2/209.13 |
| 6,409,338 B1 * | 6/2002 | Jewell | 351/158 |
| 6,424,333 B1 | 7/2002 | Tremblay et al. | |
| 6,588,497 B1 | 7/2003 | Glezer et al. | |
| 6,603,863 B1 * | 8/2003 | Nagayoshi | 381/380 |
| 6,959,207 B2 | 10/2005 | Keinonen et al. | |
| 7,036,502 B2 * | 5/2006 | Manne | 128/200.28 |
| 7,264,350 B2 * | 9/2007 | Jannard et al. | 351/158 |
| 7,682,137 B2 * | 3/2010 | Nakayama | 417/413.1 |
| 8,081,454 B2 * | 12/2011 | Ishikawa et al. | 361/694 |
| 2004/0032964 A1 * | 2/2004 | Liang | 381/370 |
| 2005/0052343 A1 * | 3/2005 | Peterson | 345/8 |
| 2005/0061316 A1 * | 3/2005 | Manne | 128/200.27 |
| 2005/0201585 A1 * | 9/2005 | Jannard et al. | 381/381 |
| 2006/0239844 A1 * | 10/2006 | Nakayama | 417/413.2 |
| 2006/0281398 A1 * | 12/2006 | Yokomizo et al. | 454/184 |
| 2007/0058824 A1 * | 3/2007 | Aylward | H04R 1/028 381/152 |
| 2009/0189748 A1 * | 7/2009 | Bergere | H04R 1/1091 340/407.1 |
| 2010/0239115 A1 * | 9/2010 | Richardson | 381/384 |
| 2011/0250958 A1 * | 10/2011 | Aarts et al. | 463/30 |

FOREIGN PATENT DOCUMENTS

| | | | | |
|---|---|---|---|---|
| EP | 1762725 A1 * | 3/2007 | | F04F 7/00 |
| EP | 1830243 A1 | 9/2007 | | |
| WO | 2005116801 A2 | 12/2005 | | |
| WO | 2008011719 A1 | 1/2008 | | |

* cited by examiner

APPARATUS AND METHOD FOR PROVIDING A USER INTERFACE TO AN INFORMATION PROCESSING SYSTEM

FIELD OF THE INVENTION

The invention relates to an apparatus for use as an output device of a user interface to an information processing system.

The invention also relates to an information processing system including a user interface, wherein the user interface includes means for providing output, e.g. in the form of at least one air flow.

The invention also relates to a method of providing a user interface to an information processing system, wherein the user interface is configured to provide output to the user.

The invention also relates to a computer program.

BACKGROUND OF THE INVENTION

The leaflet "amBX PC Gaming peripherals", downloaded from the Internet at http://www.ambx.philips.com/en/gb/ambx_leaflet_EN.pdf on 20 Nov. 2008 describes peripherals that allow gamers to experience PC games with all their senses. The range of amBX peripherals includes speakers, lights, fans and a wrist-rumbler.

To generate a flow of air with substantial momentum, the fan has to run at high speed. The momentum of the fan makes it difficult to achieve fast onset and release times.

SUMMARY OF THE INVENTION

It is desirable to provide a method, apparatus, information processing system and computer program that allow for an immersive effect to be provided that can be modulated rapidly, and that can be implemented by means of an apparatus with an inexpensive construction.

This is achieved by the apparatus for use as an output device of a user interface to an information processing system, which includes at least one device for generating a synthetic jet flow.

A synthetic jet is a jet that is synthesized from the surrounding fluid (e.g. air or liquid), requiring no net mass inflow and providing non-zero momentum output. A device for generating such a jet generally comprises at least an enclosure with an orifice and at least one transducer arranged to actuate a moving boundary of the enclosure when operating at a working frequency so as to generate pressure waves in the fluid in the enclosure. The diameter of the orifice and the amplitude and frequency of the pressure waves are such as to induce flow separation at the orifice, whereby a jet is created. Such devices have much lower response times than fans. In principle, the momentum can be adjusted by changing at least the amplitude of a driving signal to the transducer. Compared to a high-speed fan, there are fewer moving parts that have to be balanced. A further useful property is that the moving parts are generally shielded inside the disclosure, so that they are less susceptible to fouling.

Devices for generating synthetic jets are known as such. They are generally used to cool electronic components. Rapid response times are relatively unimportant to the known applications of synthetic jets.

In an embodiment of the apparatus, at least one device for generating a synthetic jet is accommodated in a housing and the apparatus comprises an arrangement for attaching the housing to a user's person.

An effect is that the airflow can be targeted more accurately at a particular user. Thus, immersive effects are experienced only by that particular user, which is useful when the apparatus is used in conjunction with an information processing system with a multi-user interface. A further effect is that a less powerful jet has to be generated to give meaningful feedback to the user. A jet directed to a user over a larger distance might be dispersed, e.g. by cross-flows.

In a variant, the arrangement for attaching the housing to the user's person includes means for mounting the housing on the head of a user.

An effect is that it is relatively easy to ensure that the airflow is directed to a part of the user's body that is generally uncovered, in particular the face. Moreover, the apparatus can be combined with other head-mounted apparatus commonly used to provide immersive effects, such as headphones and/or a head-mounted display.

An embodiment of the apparatus includes at least two conduits, a first arranged to direct an airflow to a first side of a user's body and a second arranged to direct an airflow to an opposite side of the user's body.

As an output device of a user interface to an information processing system, the apparatus should be configured to communicate information in an unambiguous way to the user. This is achieved with this embodiment, in that the direction of the airflow can encode information. In particular, this type of apparatus is suitable for use as an output device in a user interface to a system that processes navigation information, either in a real or a virtual environment, or more generally information representative of movement.

In an embodiment of the apparatus, each device for generating a synthetic jet includes at least an enclosure with an orifice on one side and at least one transducer for actuating a movable boundary on another side of the enclosure to generate pressure waves in fluid contained in the enclosure, wherein at least one of the devices is configured to enable output of a second modality to be provided by at least one of the transducers included in the device.

An effect is to enable more comprehensive immersive feedback to be provided to a user without substantially increasing the production costs of the system comprising the user interface.

In a variant, the modalities are controllable independently of each other.

That is to say that it is possible to adjust the output according to the second modality independently of the output provided by means of the synthetic jet (the first modality). An effect is to make it possible to avoid perceived dissonance between the two outputs. It is possible to give stronger haptic feedback, e.g. in the form of vibrations, without simultaneously increasing the momentum of the synthetic jet, for example. Elaborating on this example, the independent control would be useful where the apparatus is used to provide immersive effects to accompany a film showing an approaching train, since vibrations should precede the airflows to provide a realistic experience.

In a variant, at least one device for generating a synthetic jet includes at least two transducers and means for providing separate driving signals to at least two of the transducers.

This makes it possible to drive the transducers with a phase difference, e.g. in anti-phase or in phase. If the transducers move in phase, a vibration will result. If they move in anti-phase and are balanced, then no vibration will result. Thus, an effective way of providing output of a different modality from that of the air flows is provided.

In an embodiment, each device for generating a synthetic jet includes at least an enclosure with an orifice on one side and at least one transducer for actuating a movable boundary on another side of the enclosure to generate pressure waves in fluid contained in the enclosure, wherein the enclosure of at least one of the devices includes at least one conduit, the orifice being provided at a first end of the conduit and the pressure waves being received at an opposite second end of the conduit, and a cavity interposed between the second end of the conduit and the movable boundary.

In the cavity, a moving boundary with a larger surface area than the cross-sectional area of the conduit can be provided. If the volume of the cavity is sufficiently small that the acoustic flow within the enclosure is generally incompressible and the conduit is sufficiently long, it is possible to avoid Helmholtz resonance.

According to another aspect, the information processing system according to the invention includes a user interface, wherein the user interface includes means for providing output in the form of at least one air flow, which means include at least one apparatus according to the invention.

According to another aspect, the invention provides a method of providing a user interface to an information processing system according to the invention, wherein the user interface is configured to provide output to the user in the form of at least one air flow, and wherein the method includes causing at least one of the air flows to be provided by providing at least one control signal to a system including at least one device for generating a synthetic jet.

This method is suitable for providing relatively dynamic immersive feedback to one or more users.

In an embodiment of the method, each device for generating a synthetic jet includes at least an enclosure with an orifice on one side and at least one transducer for actuating a movable boundary on another side of the enclosure to generate pressure waves in fluid contained in the enclosure, wherein at least one of the devices is configured to enable output of a second modality to be provided by at least one of the transducers, the method including providing at least one control signal for controlling the operation of the at last one transducer in accordance with target values for both modalities.

An effect is that the basic device components required to generate synthetic jets are used to generate a further type of output, making the user interface more versatile without increasing its costs.

In an embodiment, at least one device for generating a synthetic jet includes at least two transducers and wherein separate driving signals are caused to be provided to at least two of the transducers in accordance with the target values for both modalities.

By providing separate driving signals in accordance with target values for both modalities, two types of output can be provided essentially independently, e.g. by introducing appropriate phase shifts or amplitude differences in the driving signals, or by providing driving signals with several frequency components and different amplitude ratios between the components.

In a variant, the second modality comprises tactile feedback.

This variant is based on the novel insight that the components required to construct a device capable of generating synthetic jets are not just suitable for generating such jets and for generating sound (they generally comprise loudspeakers), but that a further type of perceptible output can be generated.

In another embodiment, the second modality comprises sound.

In an implementation of this embodiment, a working frequency of the device for generating synthetic jets has a value below 200 Hz.

This enables one to generate sound largely independently of the generation of air flows, because the action of the transducer or transducers when operating at the working frequency does not result in audible sound.

A further variant of the method includes causing a driving signal to be provided to at least one transducer, the driving signal comprising at least a component having a carrier frequency selected in accordance with a working frequency of the device for generating a synthetic jet and an amplitude modulated in accordance with an envelope signal.

This solves the problem of how to vary the airflow so as to convey information to the user.

In a further variant, the envelope signal is caused to be adjusted in accordance with at least one of a user control signal and characteristics of at least one signal for rendering in perceptible form.

Thus, the user can control the strength of the feedback provided to him or her and/or it can be assured that there is relatively little perceived dissonance between the feedback provided by means of the synthetic jets and other perceptible outputs of the information processing system, e.g. music, video etc.

According to another aspect of the invention, there is provided a computer program including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION

Figure 1:
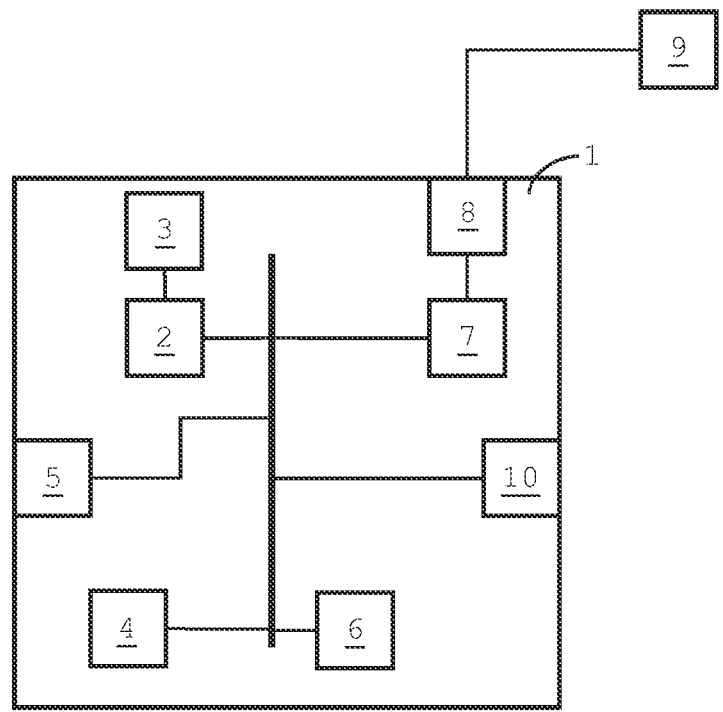
FIG. 1 is a very schematic illustration of an information processing system with a user interface comprising an apparatus including devices for generating synthetic jets.
Figure 1:
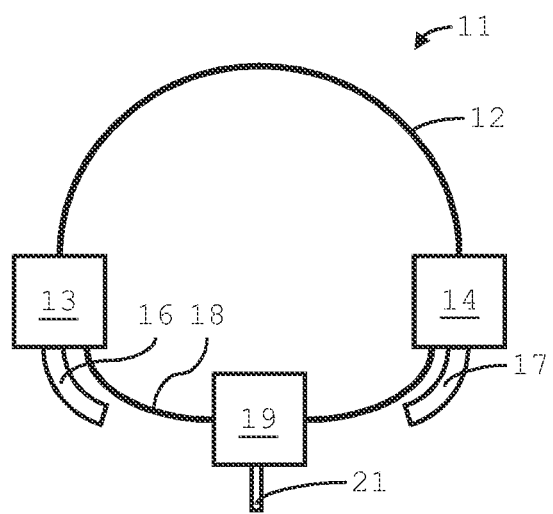

An example of an information processing system is discussed here for illustrative purposes and comprises a computing device 1 for rendering audiovisual media in perceptible form, which has a user interface that also includes means for providing haptic feedback and feedback in the form of airflows. A user interface with such means for providing haptic feedback and/or output in the form of airflows could also be used in conjunction with other types of information processing systems, including systems fitted to vehicles, e.g. navigation systems, and systems for operating industrial equipment.

The computing device 1 comprises a central processing unit 2 and memory 3 enabling it to execute software that includes software for controlling the user interface. This software enables the computing device 1 to determine the appropriate outputs, and to provide the required control signals to the output devices of the user interface, as will be explained. The software is generally stored on a mass storage device 4.

The computing device 1 obtains data, such as audiovisual content data through a network interface 5 or from a data carrier inserted in a read unit 6. Image data is rendered by means of a video codec 7, display driver 8 and display device 9.

The computing device 1 is also provided with an interface 10 to a head-set 11. The interface 10 can be suitable for establishing a wireless or wired link to the head-set 11, depending on the implementation. In an alternative embodiment, the interface 10 is adapted to establish a link to each of a number of head-sets 11 and the computing device 1 is configured to provide individual, and potentially different, control signals to each of the head-sets 11, e.g. in accordance with personal settings for the users wearing the head-sets 11.

In the illustrated embodiment, the head-set 11 includes a head-band 12 for placement of the head-set 11 over the head, but any alternative carrier means may be used. Left and right ear pads 13,14 each include a device 15 (FIG. 2) for generating a synthetic jet, which also renders the audio signal conveyed to the head-set by the computing device 1. Left and right tubes 16,17 are configured such that, with the head-set 11 in place, any airflows generated by the devices 15 are directed to the opposite sides of the wearer's face, e.g. to the cheeks.

In the illustrated embodiment, the head-set 11 further includes a brace 18 for placing a housing 19 of a further device 20 (FIG. 3) for generating a synthetic jet against the wearer's neck. This device 20 is further configured to provide haptic feedback to the wearer of the head-set 11 in the form of vibrations. A tube 21 for directing the airflow generated by the device 20 extends from the housing 19. In alternative embodiments, there can be two tubes, directed to opposite sides of the user's body (throat and neck, left side and right side of the neck, etc.). The tube 21 could also be directed upwards.

Although the head-set 11 is used here as an advantageous example of an apparatus for use as an output device of a user interface for an information processing system, alternative embodiments of such an apparatus are conceivable. For example, such an apparatus may be provided as one of a pair for attachment to the user's person by means of wrist-bands, with the air flows directed to the user's hands, for example.

It is further noted that the illustrated head-set 11 has both types of devices 15,20 for generating a synthetic jet and providing output of a second modality. An alternative embodiment could have one or more devices of only one of these types.

Figure 2:
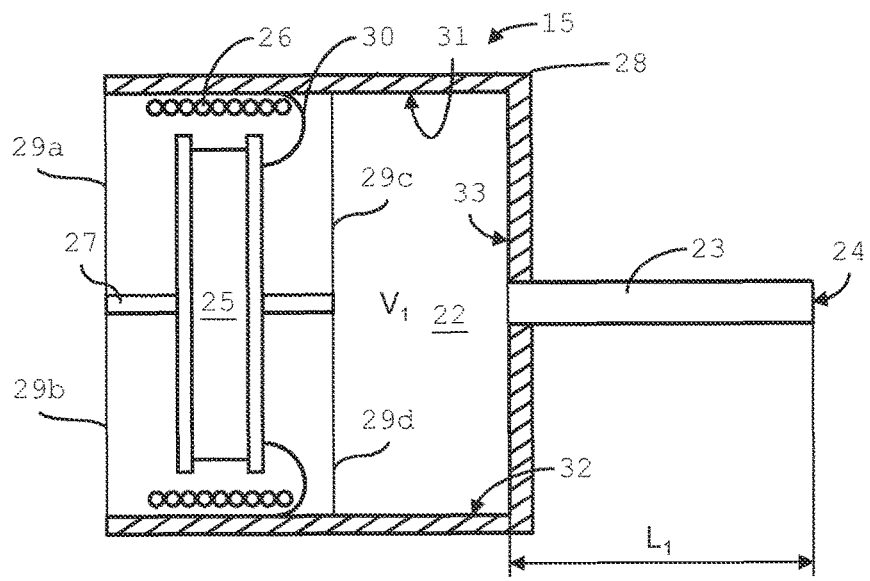
FIG. 2 is a schematic cross-section of a first device for generating a synthetic jet.

Turning to FIG. 2, the first device 15 for generating a synthetic jet, which first device 15 also renders sound, is illustrated. The first device 15 comprises an enclosure defined by a cavity 22 and a conduit 23. The conduit 23 connects to the cavity 22 at one end and terminates in an orifice 24 at the opposite end. It has a length $L_1$ between the two ends. Incidentally, although the conduit 23 is cylindrical in the illustrated embodiment, this is not an absolute requirement. The conduit 23 can moreover have any cross-sectional shape (circular, square, rectangular, etc.).

The first device 15 further includes a transducer in the shape of a permanent magnet 25 and a voice coil 26. Movement of the magnet 25 is guided by a rod 27, which is attached to a housing 28 of the device by means of a suspension in the form of blade springs 29a-d. An airtight flexible suspension rim 30 is provided to close off the cavity 22. The combination of magnet 25 and suspension rim 30 forms an airtight movable boundary of the cavity 22, which is otherwise defined by walls 31-33 of the housing 28. The movable boundary is located on an opposite side of the cavity 22 to the wall 33 in which an opening is provided for connecting the conduit 23 to the cavity 22. Because the area of the movable boundary actuated by the transducer is much larger than that of the opening in the wall 33 a jet with a relatively large momentum can be created even where the stroke of the movable boundary is relatively small. The lateral dimensions of the movable boundary are in the order of 10 cm, for example between 1 and 20 cm.

The separation between the movable boundary and the wall 33 is such that the volume $V_1$ of the cavity 22 is, in one embodiment, small enough to prevent fluid in the cavity 22 from acting as a spring in a resonating mass-spring system at the working frequencies of the transducer. In that case, the acoustic compliance of the cavity 22 is small enough that the Helmholtz frequency of the cavity 22 and conduit 23 is well above the operating frequency $f_w$ of the device 15. The acoustic flow in the cavity 22 is therefore incompressible at the operating frequency $f_w$. It is also possible to choose the working frequency $f_w$ such as to correspond essentially to the Helmholtz frequency. The conduit 23 can have a length $L_1$ smaller than one-tenth the wavelength $\lambda$ of the pressure waves at the working frequency $f_w$. Alternatively, it can be dimensioned to function as a transmission line. To this end, its length $L_1$ is greater than one-tenth the wavelength $\lambda$ of the pressure waves at the working frequency $f_w$. For resonance, $L_1 \approx (2n+1)\lambda/4$.

The working frequency $f_w$ is chosen to lie in the range below 200 Hz, more generally below 100 Hz, at around 50 Hz, so that the generation of synthetic jets is independent of the generation of sound. The dimensions of the cavity 22 and conduit 23 are adjusted to the working frequency, specifically to ensure that the velocity of the fluid flow at the orifice 24 has at least a local maximum on the frequency scale at a frequency approximately equal to the working frequency $f_w$. Furthermore, the electrical impedance of the device 15 (i.e. the impedance of transducer in combination with the cavity 22, conduit 23 and orifice 24) also has a (local) maximum, preferably the first local maximum, at a frequency approximately equal to the working frequency $f_w$.

The driving signal for the transducer thus has two components: the analogue sound signal and the signal at the working frequency $f_w$ selected for generating a synthetic jet. To achieve better separation, the sound signal is equalized by the computing device 1 or an equalizer included in the head-set 11. The equalization removes components below a cut-off frequency equal to or higher than the working frequency $f_w$.

The signal at the working frequency $f_w$ is amplitude-modulated in accordance with an envelope signal. This envelope signal is generated or caused to be generated by the computing device 1, and is adjusted in accordance with at least one of a user control signal and characteristics of the audio and/or video signal being rendered by the information processing system. The user control signal is a signal provided in response to manipulation of at least one user control by the user, in a manner similar to volume control of the audio signal.

The characteristics of the audio and/or video signal are, in one embodiment, determined by the computing device 1 by analyzing the audio and/or video data. In another embodiment, metadata or scripts representative of characteristics of the audio and/or video data are provided with the content data. This data or script is then mapped to generate the envelope signal.

Figure 3:
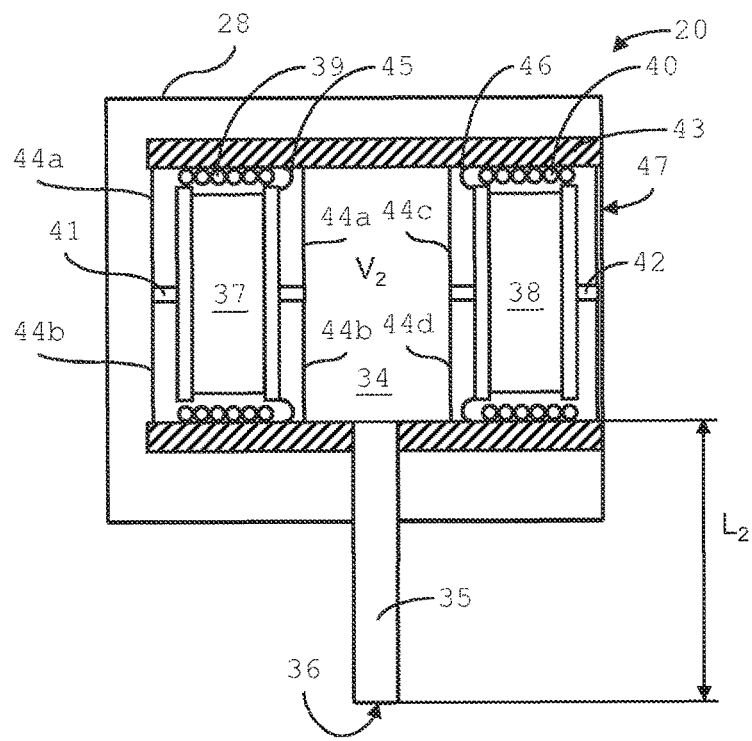
FIG. 3 is a schematic cross-section of a second device for generating a synthetic jet.

Turning to FIG. 3, the second device 20 for generating a synthetic jet, which also provides haptic feedback, will now be explained. The second device 20 comprises an enclosure defined by a cavity 34 and a conduit 35. The conduit 35 connects to the cavity 34 at one end and terminates in an orifice 36 at the opposite end. It has a length $L_2$ between the two ends. Like the conduit 23 of the first device 15, the conduit 35 of the second device 20 need not be cylindrical and can have any cross-sectional shape (circular, square, rectangular, etc.).

The second device 20 includes two transducers in the shape of respective permanent magnets 37,38 and voice coils 39,40. The magnets 37,38 in some embodiments are combined with additional non-magnetic masses. Movements of the magnets 37,38 are guided by rods 41,42, which are attached to an inner housing 43 of the device 20 by means of suspensions in the form of blade springs 44a-h. Airtight flexible suspension rims 45,46 are provided to close off the cavity 34.

Each combination of a magnet 37,38 and a suspension rim 45,46 forms one of two generally opposite airtight movable boundaries of the cavity 34, which is otherwise defined by the inner housing 43. An opening is provided for connecting the conduit 35 to the cavity 34.

The area of each movable boundary is much larger than that of the opening. In fact, the lateral dimensions of the movable boundaries are each in the order of cm, at least 1 cm. The volume $V_2$ of the cavity 34 is, in one embodiment, small enough to prevent fluid in the cavity 34 from acting as a spring in a resonating mass-spring system at the working frequencies of the transducer. The acoustic compliance of the cavity 34 is preferably small enough that the Helmholtz frequency of the cavity 34 and conduit 35 can be well above the operating frequency $f_w$ of the device 20. The acoustic flow in the cavity 34 is therefore incompressible at the operating frequency $f_w$. In one embodiment, the conduit 35 has a length generally smaller than one-tenth the wavelength $\lambda$ of the pressure waves at the working frequency $f_w$. In another embodiment, the conduit 35 functions as a transmission line. To this end, its length $L_2$ is greater than one-tenth the wavelength $\lambda$ of the pressure waves at the working frequency $f_w$. For resonance, $L_1 \approx {(2n+1)\lambda}/{4}$.

The dimensions of the cavity 34 and conduit 35 are adjusted to the working frequency, specifically to ensure that the velocity of the fluid flow at the orifice 36 has at least a local maximum on the frequency scale at a frequency approximately equal to the working frequency. Furthermore, the electrical impedance of the device 20 (i.e. the impedance of a transducer in combination with the cavity 34, conduit 35 and orifice 36) also has a (local) maximum, preferably the first local maximum, at a frequency approximately equal to the working frequency, when the movable boundaries are moving in anti-phase (and the device 20 is thus producing a synthetic jet), i.e. alternately towards and away from each other.

To generate vibrations, the magnets 37,38 are made to move in phase. To enable the synthetic jet to be controlled independently of the vibrations, the working frequency $f_w$ is generally outside the frequency range within which the vibration frequency lies. Thus, the driving signal to the two transducers is a superposition of the signal at the working frequency $f_w$, where the respective components have a phase difference such as to cause the magnets 37,38 to move in anti-phase, and a signal at the vibration frequency, where the respective components are such as to cause the magnets 37,38 to move in phase.

The computing device 1 provides the appropriate amplitudes of the respective components. Alternatively, the computing device 1 can provide the target signals, which are translated to driving signals by e.g. a digital signal processor (not shown) in the outer housing 19.

The conduit 35 directs the synthetic jet towards the user. The vibrations are conveyed to the user through a wall 47 of the outer housing.

Thus, the second device 20, like the first device 15 allows output of two modalities to be provided independently using a single device. This is done by providing a composite driving signal to each transducer, with the components adjusted in accordance with the desired level of the respective types of output.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

In an alternative embodiment of the devices 15,20, a different type of actuator is used. An alternative actuator can comprises a stationary permanent magnet and moving mass with voice coil. Other alternatives include electrostatic drivers, electret drivers and magnetostatic drivers, all known from the field of loudspeaker technology.

The computing device 1 may be portable and of a slightly simpler construction than illustrated, e.g. forming a portable media player. Furthermore, even where the appropriate software or scripts for providing immersive effects to accompany other types of perceptible output are not available, the apparatus described herein may be used to provide a continuous air flow to cool the person using it.

The invention claimed is:

1. A method of controlling an output device comprising first and second spaced apart transducers coupled to a cavity enclosed within a housing, said output device being adapted to produce a plurality of different perceptible output modalities for conveying information to a user in response to respective drive signals applied to at least one of said transducers, said method comprising:
   applying a first drive signal having a frequency range effective for forcing a synthetic fluid jet through an opening in communication with the cavity to operate said transducers in anti-phase with respect to each other to effect production of an adjustable airflow modality; and
   applying a second drive signal to operate said transducers in-phase with respect to each other to produce a vibration modality.

2. The method as claimed in claim 1, wherein the vibration modality comprises sound.

3. The method as claimed in claim 1, wherein the first drive signal comprises a component having a carrier frequency that is amplitude modulated in accordance with an envelope signal.

4. The method as claimed in claim 1 wherein said first and second drive signals are applied simultaneously to the first and second transducers to effect said first output modality simultaneously with said second output modality.

5. The method as claimed in claim 4, wherein the output according to the vibration modality is adjustable independently of the output according to the airflow modality.

6. A computer program embodied in a non-transitory computer-readable medium for causing a computer, executing the computer program, to perform a method of controlling an output device comprising first and second spaced apart transducers both coupled to a cavity enclosed within a housing, said output device being adapted to produce a plurality of different perceptible output modalities for conveying information to a user in response to respective drive signals applied to at least one of said first and second transducers, said method comprising:

applying a first drive signal having a frequency range effective for forcing a synthetic fluid jet through an opening in communication with the cavity to operate said first and second transducers in anti-phase with respect to each other to effect production of an adjustable airflow modality; and applying a second drive signal to operate said transducers in-phase with respect to each other to produce a vibration modality.

\* \* \* \* \*